CHEMICAL BLANK COLORIMETRIC ANALYZER

INVENTOR:
GEORGE W. SCHNEIDER, JR.
BY Howson & Howson
ATTYS.

CHEMICAL BLANK COLORIMETRIC ANALYZER

Filed May 28, 1958 5 Sheets-Sheet 2

INVENTOR:
GEORGE W. SCHNEIDER, JR.
BY Howson & Howson
ATTYS.

April 17, 1962 G. W. SCHNEIDER, JR 3,030,192

CHEMICAL BLANK COLORIMETRIC ANALYZER

Filed May 28, 1958 5 Sheets-Sheet 3

INVENTOR:
GEORGE W. SCHNEIDER, JR.
BY Howson & Howson
ATTYS.

CHEMICAL BLANK COLORIMETRIC ANALYZER

Filed May 28, 1958 5 Sheets-Sheet 4

INVENTOR:
GEORGE W. SCHNEIDER, JR.
BY Howson & Howson
ATTYS.

April 17, 1962 G. W. SCHNEIDER, JR 3,030,192

CHEMICAL BLANK COLORIMETRIC ANALYZER

Filed May 28, 1958 5 Sheets-Sheet 5

INVENTOR:
GEORGE W. SCHNEIDER, JR.
BY Howson & Howson
ATTYS.

United States Patent Office 3,030,192
Patented Apr. 17, 1962

3,030,192

CHEMICAL BLANK COLORIMETRIC ANALYZER

George W. Schneider, Jr., St. Petersburg, Fla., assignor to Milton Roy Company, Philadelphia, Pa., a corporation of Pennsylvania Filed May 28, 1958, Ser. No. 738,524
8 Claims. (Cl. 23—253)

The present invention relates broadly to colorimetric analyzers of a type providing for automatic photocolorimeter apparatus which automatically samples the fluid to be analyzed, and then chemically analyzes the samples for various constituents by improved colorimetric techniques. The present application constitutes a continuation in part of my copending application Serial Number 609,981, filed September 14, 1956, now Patent No. 2,950,396.

The novel analyzer described and claimed in my said copending application permits the automatic and improved performance of many chemical analyses such for example as the analysis of water for silica, calcium and magnesium hardness, residual chlorine, sugar, phosphates and the like. The basic apparatus, system and circuits are adequately set forth in my copending application, and only such apparatus will be described and shown in the present application as are necessary for an understanding of the improvements, changes and additions effected in the basic apparatus.

It is an object of the present invention to incorporate in my previously described colorimetric analyzers, means for compensating for impurities in the reagents used which makes it susceptible to analyze samples for very small traces of silica or other impurities, depending upon the specific chemical analysis being undertaken by the apparatus.

Another object of the present invention is to include in a colorimetric analyzer, a reagent reacting vessel or reagent blank reaction vessel into which the various reagents used are so introduced as to fix the chemical reaction therebetween and permitting a true chemical blank to be formed, which compensates for chemical impurities in the reagents utilized.

A further object of the present invention is to provide a colorimetric analyzer having controlled volume dispensing means for sampling fluid to be analyzed, and for adding reagents to a predetermined volume of fluid sample, and further including a unique arrangement of pump porting whereby the various fluids and reagents utilized are never intermixed to eliminate contamination of the sample and/or reagents involved. The unique system utilized renders it possible to accurately meter equal portions of two different fluids through a combination of outlets to two different points in such a manner that there is never any intermixing or contamination of the two fluids.

A still further object of the present invention is to provide in colorimetric analyzers of the type described, means for providing a zero blank in the nature of a monobed ion-exchange cartridge, operable as a demineralizer, to remove all ions such as silica, magnesium, calcium or iron, depending upon the material being sought in the analyzing process.

Further objects and advantages of the present invention will be more readily apparent from the following detailed description when taken together with the accompanying drawings in which.

Figure 11:
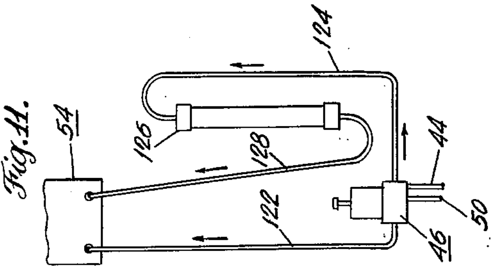
Figure 7:
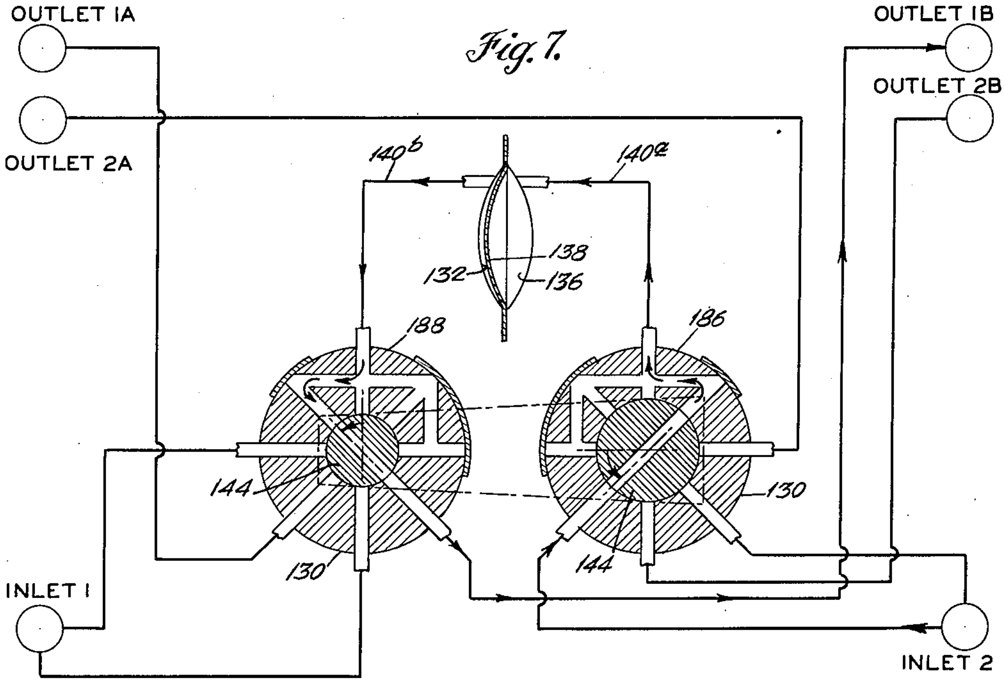
Figure 8:
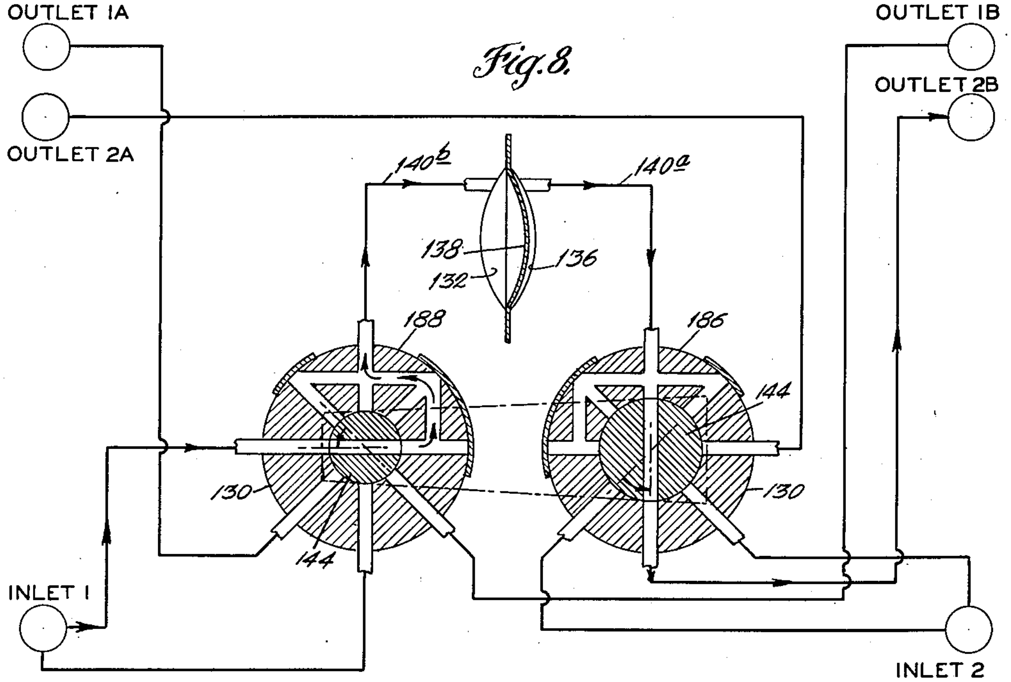
Figure 9:
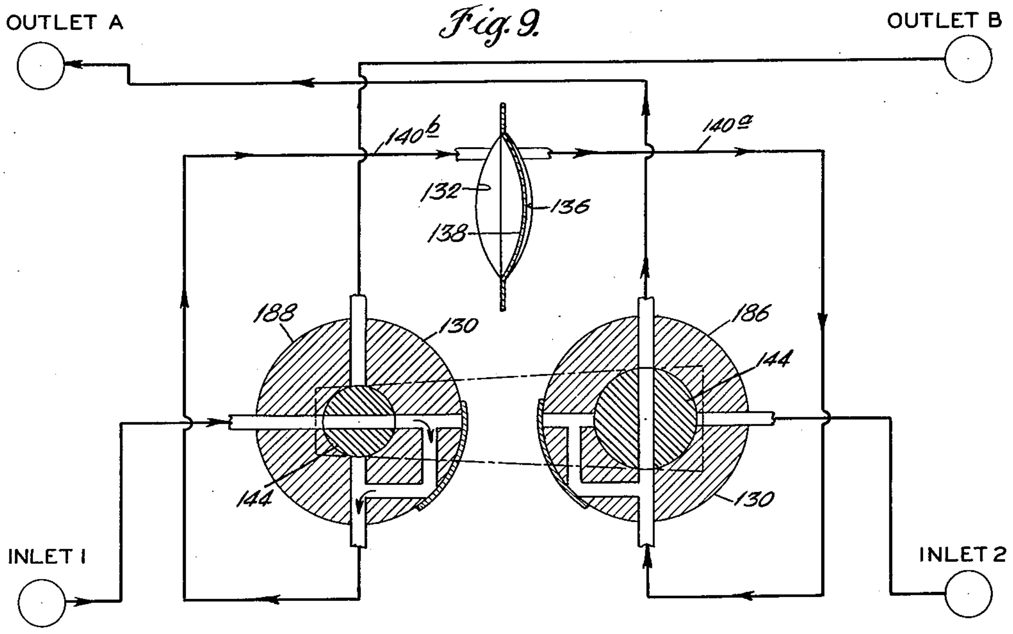
Figure 10:
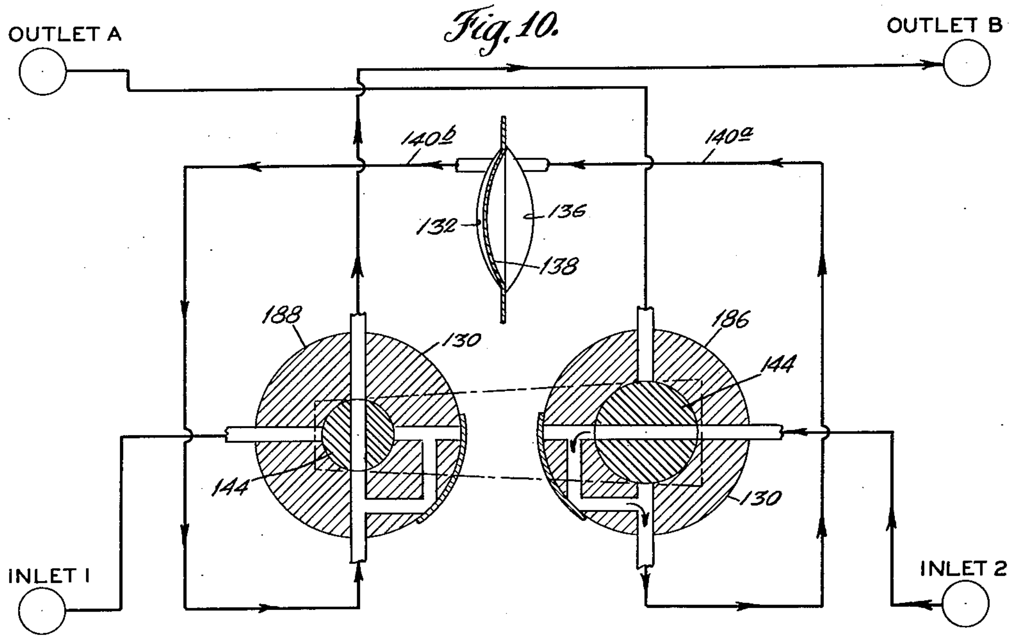

FIGS. 5–8 inclusive are schematic illustrations of a pump metering and distribution system adapted for distributing two different fluid reagents while preventing intermixing or contamination thereof;

FIGS. 9 and 10 are schematic illustrations similar to FIGS. 5–8 of a pump metering and distribution system for distributing a sample or test fluid to two separate locations; and FIG. 11 is a fragmentary view of a modified analyzer circuit incorporating a demineralizer.

The basic system and its operation have been discussed in detail in my copending application Serial Number 609,981, and substantially the same basic system and circuitry are utilized in the present invention. Only such details of construction and operation will be repeated in the present application as may be required for a complete and full understanding of the present invention.

In operation, equal volumes of a sample liquid which is to be analyzed for a constituent, for example silica, are fed by a sample pump to a comparison or blank cell and a sample cell in the over-all analyzer assembly or optical system. The same liquid is dispensed into both the sample and comparison cells so that there is automatic compensation for any turbidity or color in the sample liquid in the two cells. Reagents required to produce a color corresponding to the constituent in the sample liquid are then added in measured quantities to the sample cell by reagent pumps of a construction uniquely adapted for this purpose, in conjunction with metering and pumping assemblies which prevent contamination or intermixing of the reagents. A specific example of the reagents added and the method of addition so as to obtain an accurate determination of the constituent present in the sample liquid is set forth in more detail in the copending application of George W. Schneider and George Schaffer, assigned to a common assignee with the present application, filed on even date herewith, Serial Number 738,263, to which reference is made for details of the chemical aspects of the invention and which by reference is incorporated herein.

The reagents added are so chosen as to produce, in connection with a silica content analysis, a molybdenum blue color which is colloidal in nature, and which acts as a shade to prevent passage of light at all wave lengths. After the reagents have been introduced into the sample cell and allowed to react for sufficient time to complete the reactions, a measuring circuit is operated to determine the difference in transmission of light through the sample cell and comparison cell through the medium of a common light source for the two cells, and the beams of light traveling through the cells impinge upon phototubes or the like. The difference in intensity through the two cells, which depend upon the constituents within the cells, result in output currents from the two phototubes and are impressed upon portions of a bridge circuit as more fully explained in my copending application Serial Number 609,981. The other circuitry involved results in a visual recording of the percentage transmittancy of the sample cell. By selection of chart paper with appropriate scales, the recorder can be made to provide direct readings in parts per million, percent, or any other selected unit of the concentration of constituent material in the sample water.

My copending application Serial Number 609,981 provided an accurate and reliable controlled volume dispensing means for automatically feeding sample fluid and various reagents to a photocolorimeter analyzer. The photocolorimeter which is of a comparison type, automatically compensated for any turbidity in the fluid being measured. Automatic standardization of the measuring circuit during each cycle of the analyzer, eliminated from the measurements any errors due to differences in light beam intensities arising from any accumulation of dirt in the optical system or on the windows of the sample cells. The measuring circuit used is independent of variations in light source brightness, phototube characteristics, temperature, and line voltage.

In addition to the apparatus and features disclosed in my previous application, it has been found desirable to provide a unique system whereby it is possible to accurately meter equal portions of two different fluids through a combination of outlets to two different points in such a manner that there is never any intermixing or contamination of the two fluids. This provides for the utmost accuracy of the test results and pertains particularly to a metering pump assembly which will be described in detail hereinafter. This feature of the present invention is effected in a simple and accurate assembly which does not require an arrangement of solenoid valves or separate pumps which otherwise would be required.

Additionally, in practice, it has been found to be desirable to measure constituents in the very low range of parts per billion (p.p.b.), for example, 0 to 50 p.p.b. of silica in water, or 0 to 30 p.p.b. of oxygen in water In making analyses in such low ranges it is imperative that errors due to impurities in the reagents be cancelled out since, for example, in measuring low range silica the slightest trace thereof in any of the reagents would result in a considerable error in the indicated values of the instrument. For this reason, in one embodiment of the invention, a comparison is made between a sample fluid in a sample cell and a zero blank fluid in the comparison cell. The fluid in the zero blank or comparison cell must be free of the constituent such as silica, iron or total hardness for which the analysis is being made. In accordance with the teaching of the present invention, this zero blank is obtained by passing a portion of the sample fluid through a monobed ion-exchange cartridge consisting of a mixture of anion and cation resins. The sample water which passes through this demineralizer is stripped of substantially all ions.

Figure 1:
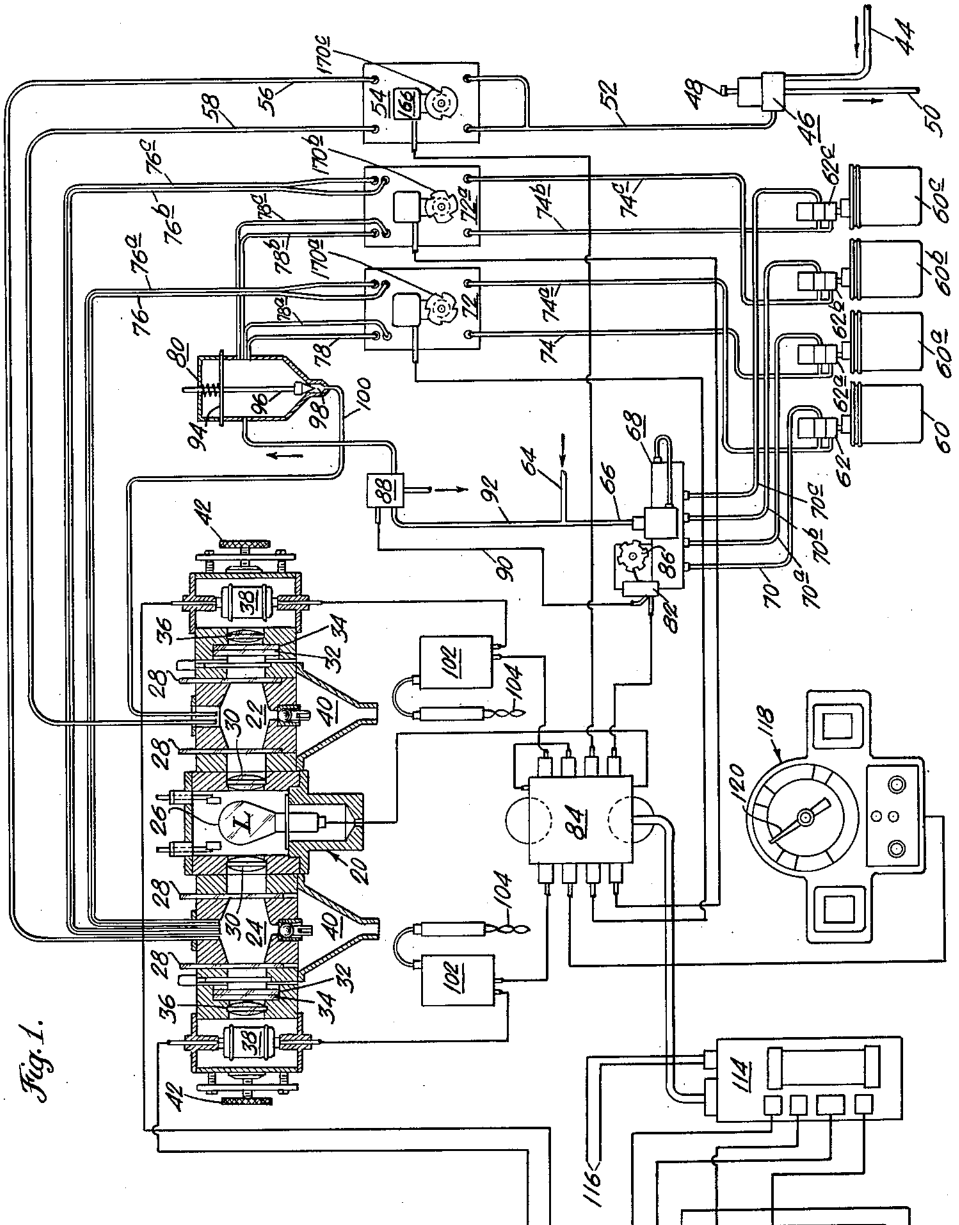
FIG. 1 illustrates schematically an automatic colorimetric analyzer embodying the present invention.

Referring now to the drawings, which for purposes of illustration alone, depict a system and apparatus adapted for analyzing for silica content in water, FIG. 1 shows schematically the over-all system for practicing the invention. An analyzer assembly, broadly designated 20, incorporates an optical system having a straight line construction and which is shown and described in detail in my copending application Serial Number 735,837, filed May 16, 1958, now Patent No. 2,991,688, to which reference is made for details. Basically, this optical system includes a comparison or blank cell 22 and a sample cell 24 in spaced alignment on opposite sides of a common illumination or light source 26. This light source in the present instance consists of a lamp L. The ends of the cells 22 and 24 are formed of a transparent member 28 at each end, of glass, plastic, or the like. Interposed between the lamp L and the inner ends of cells 22 and 24 are collimating lenses 30. Outwardly disposed from the outer ends of the cells 22 and 24, there are filters 32 and 34, focusing lenses 36 and photocells 38. Drains 40 are provided for each of the cells 22 and 24. Clamping screws 42 at opposite ends of the optical system are utilized for holding the plurality of members forming this optical system in correct association and alignment.

While the optical system as disclosed in this application differs from that shown in my application Serial Number 609,981 in that it is a straight line configuration, the basic principles as applied to color analysis remain the same. Measured quantities of the sample to be analyzed are periodically introduced into the comparison and sample cells, and certain reagents and buffers are added to the sample cell to produce a color indicative of the amount of impurity or chemical contained in the water. As applied to a silica determination, however, when working in the very low p.p.b. ranges it has been found that impurities or traces of the constituent sought in the reagents themselves prevent obtaining a true silica content determination with respect to the sample water. For this reason, it is essential either to obtain a true chemical blank by use of the system as shown in FIG. 1 of the drawings, or to utilize a demineralizer to obtain a zero blank as diagrammatically shown in FIG. 11.

Referring again to FIG. 1 depicting the chemical blank system, a sample supply line 44 continuously introduces the sample fluid under pressure to a regulator 46 having a back pressure regulator adjustment member 48 and a drain pipe 50. Conduit 52 conducts the sample water to a sample pump and metering mechanism generally designated 54. This mechanism includes a minus delta P pump for accurately measuring and pumping the sample, and has two separate inlets and two separate outlets so that the test sample and the comparison sample can be equally proportioned to the sample cell and the comparison cell of the analyzer. The construction and operation of this assembly will be described in detail in connection with FIGS. 2, 3, 9 and 10 hereinafter. The assembly 54 acts, however, broadly to introduce equal quantities of the sample water through lines 56 and 58 to sample cell 24 and comparison or blank cell 22 respectively. Due to the fact that the sample water is introduced into both of the cells turbidity or impurities therein will tend to optically balance out.

In order to obtain the coloring utilized for measuring the silica content in the water, certain reagents and additives must be combined with the sample water, and at the same time any impurities in the reagents themselves must be negatived in the results obtained. In the example described herein and in the apparatus shown on the drawings, which pertains to silica content determination, four reagent reservoirs or containers 60, **60*a*, 60*b* and 60*c* are provided, above which are mounted air actuated transfer pumps 62, 62*a* 62*b* and 62*c*. A source of air supply such as plant air supply, is connected into the circuit by line 64 having a section 66 connected into a three way solenoid valve and pacer unit 68 from which extend air lines 70, 70*a*, 70*b* and 70*c* interconnected at their opposite ends into air operated transfer pumps 62–62*c*. Reagent metering pump assemblies 72 and 72*a* of a type having two inlets and four outlets, which will be described hereinafter, are each adapted for measuring and dispensing two reagents into the sample and comparison cells, and are interconnected with the reagent reservoirs by means of lines 74, 74*a*, 74*b* and 74*c***, each of which lines lead to one of the reagent reservoirs as shown in FIG. 1.

These metering pump assemblies 72 and **72*a* are adapted and used to introduce into the sample cell carefully measured amounts of the reagents from all of the reagent reservoirs through lines inter-connecting the pump assemblies and the cells. Of these lines, those indicated at 76 and 76*a* lead from pump assembly 72 to carry reagents from reservoirs 60 and 60*a* directly to sample cell 24. In like manner, lines 76*b* and 76*c* are connected with pump assembly 72*a* for leading reagents from reservoirs 60*b* and 60*c* directly to sample cell 24. Second sets of lines 78, 78*a* and 78*b*, 78*c* are respectively connected to pump assemblies 72 and 72*a* for introducing reagents from reservoirs 60, 60*a*, and 60*b*, 60*c* into a reagent blank reaction vessel generally designated 80**. As previously pointed out, when making an analysis in very low ranges of p.p.b. it is imperative that errors due to impurities existing in reagents be cancelled out since, for example, in measuring low range silica, the slightest trace of silica in any one of the reagents or deterioration resulting from age, or other cause, would result in a considerable error in the indicated values of the instrument. While under some circumstances a demineralizer as shown in FIG. 11 can be used to provide a zero blank fluid in a relationship hereinafter described, there are objections to its use on the basis that if the demineralizer should fail for some reason there would be no indication of its failure. In such an instance, the instrument would record values indicating that the sample water was very low in silica, which may not be a true indication. For the particular case of low range silica analysis, the device shown in FIG. 1 is utilized and results in a method whereby a true chemical blank is formed, but both the sample and comparison measuring cells are filled with the same sample fluid.

With this arrangement the incoming sample water from line 44 is measured in equal quantities by the metering pump asembly 54 and delivered to both the sample cell 24 and the comparison cell 22. The four reagents which are handled by two separate metering pump assemblies 72 and 72*a*, each of which has two inlets and four outlets, are fed into reagent blank reaction vessel 80 instead of being fed directly into comparison cell 22. The sequence of operation when using this arrangement is as follows:

First, the sample fluid is fed to both the sample cell 24 and comparison cell 22. The circuit will then be automatically zeroed substantially as in my preceding application Serial Number 609,981, so that the output from the sample measuring phototube adjacent the sample measuring cell 24 is the same as the output from the zero comparison phototube 38 adjacent the comparison cell 22. The four reagents are then fed into the sample cell 24 where they react to produce a blue color equal in intensity to the silica present in the sample plus any silica which may be present as impurities in the reagent. The four reagents are then fed into the reagent blank reaction vessel 80 where they are allowed to react, producing a blue color equal in intensity to only the silica impurities which are present in the reagent and subsequently, at the proper time interval, the three way solenoid valve device 68 is energized through switch 82 connected into a commutator device broadly designated 84, and operating through cam means 86 associated with the three way solenoid valve and pacer unit 68 for operation of the air transfer pumps 62–62*c*.

The three way solenoid valve 88 as shown in FIG. 1 is interconnected with switch 82 by lead 90, and air is introduced therein through line 92 interconnected with plant air supply through line 64. When the three way solenoid valve 88 is energized it admits air presure into the reagent blank reaction vessel 80 which in turn lifts a flexible rubber diaphragm 94 mounted therein, and which has connected to it a needle valve 96 which acts to shut off the small drain port 98 at the bottom of the reaction vessel 80. The lifting of this diaphragm 94 causes the needle valve to open and air pressure then forces the reactive reagents contained therein through the bottom drain tube 100 into the comparison cell 22. The important feature of this method and apparatus resides in that reaction between the various reagents is brought to completion and fixed when a third reagent, which is oxalic acid, is added so that when this reacted solution is added to the comparison cell no further color development can take place due to the silica in the sample water in the comparison cell. The final step in this analysis is to measure the difference in light transmission through the silica sample in the sample cell 24 and the chemical blank solution or mixture in comparison cell 22 by virtue of the analyzer assembly, in conjunction with the remainder of the system substantially as described in my copending application Serial Number 609,981.

The remainder of the system and circuitry shown in FIG. 1 is substantially identical with that shown in this preceding copending application, and includes in operative association drain valve solenoids and agitator drives 102 for each of the cells 22 and 24, the agitators being schematically shown at 104 and adapted for insertion in the sample cells. The recorder assembly generally designated 106, includes the recorder stylus 108 with a recorder motor 110, and zero motor 112. The power chassis 114 is adapted for connecting through lead 116 to a 110 volt 60 cycle alternating circuit source of supply. A control panel 118 includes a cycle indicator 120. Operation of the individual steps in the proper time sequence required for the analyzing method are obtained by means of the commutator 84 of a particular character, but which does not go to the essence of the present invention and is not necessary of detailed description herein being of a type known to those skilled in the art, as is the remainder of the circuitry and system only generally described hereinabove.

The specific reagents utilized in the reservoirs or containers 60–60*c*, and the chemical reaction obtained are more specifically set forth in my copending application Serial Number 738,263, filed May 28, 1958, which is by reference incorporated herein. Briefly, however, the purpose of the blank reaction vessel is to react reagent number 1, the buffer system, with reagent number 2 which is ammonium molybdate, so that if any impurities in the form of silica are present in the reagent, a blue color will develop which is proportional to the amount of silica impurities present. After a given time interval, reagent number 3, oxalic acid, is added to the reagent vessel to destroy any blue complexes which form due to interfering ions such as phosphorus and to, also, fix or short-stop the reaction so that further addition of silica will not produce any more color reaction. The further addition of reagent 4, the reducer, to the reaction vessel develops the blue color of the silica molybdate complex. These same reagents are also metered into the sample cell 24 where they react to produce a blue color due to the total silica contained in the sample water, plus the silica impurities in the reagents. At the proper interval in the time cycle, the reacted reagents in the chemical blank reaction vessel 80 are pumped by means of air pressure up into the sample water contained in the comparison cell 22, and since the reaction of these reagents has already been fixed and developed in the reaction vessel 80, no further color development is produced by the silica present in the sample water, and the only color indication in the comparison or blank cell 22 is that due to the impurities which were present in the reagents. By this technique, a true chemical blank is formed with complete compensation for impurities in the reagents, which make it practical to analyze the very small traces of silica in the p.p.b. range using commercially available reagents.

As pointed out hereinbefore, under some circumstances it is possible to eliminate errors due to impurities in reagents by making a comparison between a sample fluid in the sample cell and a zero blank fluid in the comparison cell. The fluid in the zero blank or comparison cell must be free of the constituent such as silica, iron, etc. for which the analysis is being made. To provide this zero blank, I have devised a method whereby a portion of the sample fluid is passed through a monobed ion-exchange cartridge consisting of a mixture of anion and cation resins. A portion of a circuit for practicing this aspect of the invention is shown in FIG. 11. The regulator 46 is similar to that shown in FIG. 1, having a sample inlet 44, and drain 50. It differs, however, in that instead of a single line 52 leading therefrom to the metering pump assembly 54 there are two lines 122 and 124. The line 122 takes sample water directly to the metering pump assembly 54, while the line 124 takes sample water and introduces it into a demineralizer cartridge 126. The sample water which passes through this demineralizer is stripped of all ions such as silica, magnesium, calcium or iron, for which the analyzer is operated, and for all practical purposes there will be no more than several p.p.b. of the ion for which the analyzer is measuring. In making an analysis by this technique the sample fluid is measured and introduced into the sample cell 24 by the metering pump assembly 54, and the demineralized zero blank fluid from the demineralizer 126 through line 128 and metering pump assembly 54 is measured and introduced into the comparison cell 22.

Equal quantities of all reagents are then metered into both the sample cell and the comparison cell, and since none of the ions being sought are present in the comparison cell, the only color development which will take place will be due to the impurities which may be available in the reagents. Since the same reagents and their impurities will also be present in the sample measuring cell, an equal color development will develop in the sample cell which will cancel out the color due to its impurities which also develops in the comparison cell. Since in trace analysis, the original sample will only contain a maximum of, for example, 100 p.p.b. of the constituent being measured, a very small demineralizer cartridge has a long life and can be replaced with a new cartridge easily. This invention accordingly teaches a system consisting of a plurality of metering pump assemblies and a monobed ion-exchange cartridge so arranged to dispense equal quantities of measuring fluid and zero blank fluid to the respective measuring cells. The method also utilizes the basic system and circuitry as in my previous copending application Serial Number 609,981.

The metering pump assemblies have been broadly discussed hereinabove. Now with more specific reference to FIGS. 2–10 inclusive which schematically show the structure and operation of the pump and valve structure, this mechanism will be described. The metering pump assemblies broadly indicated as 54, 72 and 72*a* in FIG. 1 include a pump body 130 of substantially solid material and having a spherical cavity 132. A pump cap 134 is affixed to the end of pump body 130 and has a spherical cavity 136 corresponding to the pump cavity 132 in shape and size therein. Interposed between the pump body 130 and cap 134, between the cavities 132 and 136, is a flexible diaphragm 138 preferably of Teflon material. A plurality or series of small passageways 140 are cast in pump body 130 in any well-known manner. These passageways are formed in accordance with the showing of the flow diagrams in FIGS. 5–10 inclusive. For use as a sample metering pump, the passageways define two inlets and two outlets, whereas for use as reagent metering pumps the passageways define two inlets and four outlets, and the various passageways are so arranged in separate series as to form front passageways 140*a* and rear passageways 140*b*. A tapered opening or bore 142 is provided in the rear end of pump body 130 into which ends of the various passageways open. A Teflon plug valve or the like 144 of a shape and size corresponding with the bore 142, is rotatably inserted in the bore 142 and contains passageways and ports on two different planes in the front and back portions thereof, providing front and back porting arrangements for coaction with the passageways 140*a* and 140*b*. In the metering assembly pumps including two inlets and two outlets as diagrammatically shown in FIGS. 9 and 10, these ports are drilled 90° apart in the two different planes referred to. In the pump assemblies having two inlets and four separate outlets, however, the ports and passageways are so arranged that the ports are drilled 45° apart with respect to the front and back planes.

Figure 2:
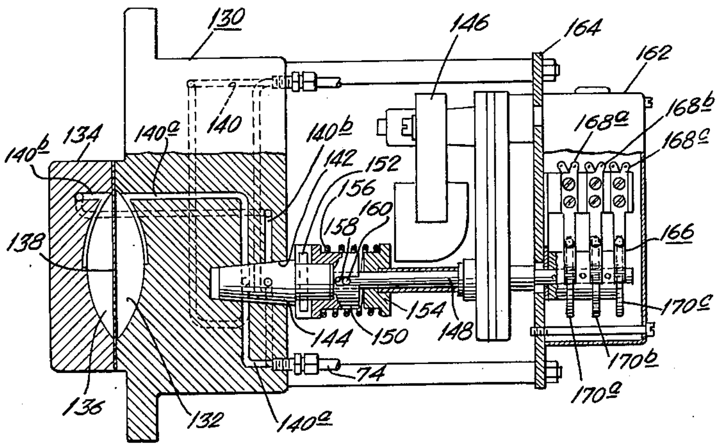
FIG. 2 is an enlarged view, parts being shown in section, of fluid metering and distributing means incorporated in a pump assembly.
Figure 3:
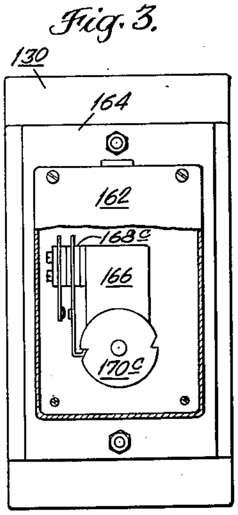
FIG. 3 is an end view, parts being broken away for clarity, of the metering and pump assembly of FIG. 2 taken from the right end thereof.

In the metering pump shown in FIGS. 2 and 3, means are provided for rotating and accurately positioning the Teflon plug valve including a motor assembly broadly designated 146 having an output shaft 148. A plug valve collar 150 is secured on the rear end of the plug valve by means of a pin 152. A spring support 154 is operatively associated with the housing for the output shaft 148. A spring 156 is interposed between collar 150 and support 154 to maintain the plug valve 144 properly positioned in the bore 142. The valve collar 150 is slotted at 158 and a pin 160 located on the output shaft 148 of the motor engages in the slot for rotation of the plug valve. A switch box 162 is secured on motor mounting plate 164. A contact switch assembly broadly indicated 166 is mounted in the switch box and for rotation of the plug valve in 45° increments or steps includes three switches 168*a*, 168*b* and 168*c*. Three cams 170*a*, 170*b* and 170*c* are secured on the free end of the output shaft 148 of motor assembly 146 for coaction with the switches 168*a*, 168*b* and 168*c* respectively as schematically shown in FIG. 4.

Actuation of this plug valve is obtained through a series of electrical contacts located on a commutator switch which is mounted on the main timer assembly of the analyzer. FIG. 4 schematically shows a wiring diagram including the wiring connections between the commutator contacts and the minus delta P limit switches referred to hereinabove. Leads 172 are adapted for connection with a 110 volt 60 cycle source of electrical energy. Lead 174 is connected to one side of motor 146 and the other side of the motor is connected by a common lead 176 to each of the switches 168*a*, 168*b* and 168*c*. Leads 178*a*, 178*b* and 178*c* connect the other portions of these switches to a plurality of commutator contacts 180*a*, 180*b*, 180*c* and 180*d*. A common commutator bar 182 is connected to one of the leads or lines 172 as shown. A brush assembly with shorting bar 184 is adapted for coacting with common commutator bar 182 and the commutator contacts 180*a*–180*d* to sequentially rotate the plug valve in the desired manner. The direction of movement of the commutator brush assembly 184 is from left to right in FIG. 4.

Figure 4:
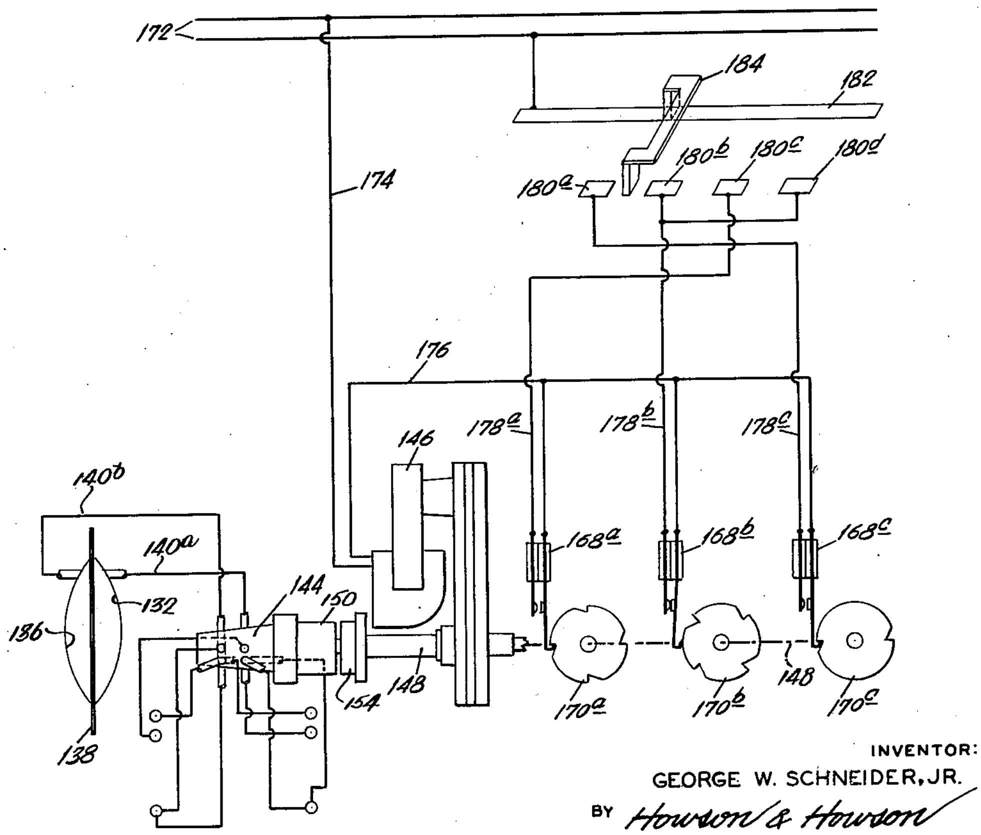
FIG. 4 is a schematic illustration of the actuating means for the pump and metering assembly, including the electrical circuitry and operating cams for the mechanism.

As shown in FIG. 4, the brush assembly 184 has just left the first commutator contact 180*a* of the commutator assembly which homes the motor to position number 1 as indicated by switch 168*c* being open at cam 170*c*. When this brush assembly next contacts commutator contact 180*b*, the valve motor will be energized since switch number 168*b*, which is actuated by cam 170*b*, is now in the closed position. When this motor is actuated, it will rotate the plug valve and cam 170*b* through 45° until the switch opens at the next notch in cam 170*b*. The brush assembly will next contact commutator contact 180*c* and actuate cam 170*a* which will again position the valve another 45° in the direction indicated by the arrow on the cam. The final and fourth cycle of operation of the minus delta P pump will be obtained when the brush assembly 184 contacts commutator contact 180*d* which is also common with commutator contact 180*b* which positions the plug valves and cam back to their starting position.

By reference to FIGS. 5–8 inclusive, it will be noted that four separate actuations of the plug valve are necessary in order to discharge equal quantities of fluid from each of the four separate outlets of the reagent metering and measuring devices. This action is initiated by the commutator contacts and synchronized properly by means of the three cams located on the actuator shaft. Since it is possible for such an arrangement to get out of step or phase as a result of an intermittent power failure, the circuit is so wired that cam 170*c* always acts as a homing switch to bring the pump back into the proper sequence of operation. This is imperative in order that the reagents from the four outlets be delivered to the sample and comparison cells in the proper sequence.

As pointed out above, the minus delta P pump used for measuring and metering the sample has two separate inlets and two separate outlets so that the sample to be measured and the zero comparison sample are equally proportioned to the sample cell and comparison cell of the analyzer and by means of a unique arrangement of the pump porting, neither of these fluids are ever intermixed and there is no contamination of the sample. In the minus delta P pumps for metering the various reagents, each of the pumps has two separate inlets and four discharge connections, and the pump is ported in such a manner that each of the two separate reagents handled by the pump are equally metered to the sample and comparison measuring cells of the analyzer with no intermixing or contamination of the reagents.

To describe how this unique feature is accomplished, reference is made to FIGS. 9 and 10 schematically depicting the flow diagram which shows the arrangement of internal passageways for a pump which uses two inlets and two separate outlets. In all these various arrangements, switching of the various ports is obtained through the Teflon plug valve containing two ports drilled 90° apart and on two different planes referred to as back plane 186 and front plane 188. In FIG. 9 the plug valve is in such a position that outlet A is discharging and fluid is flowing into inlet 1. Since inlet 1 is under a positive pressure, it will be seen by tracing the passageway through the plug valve that the diaphragm 138 of the minus delta P pump at the top is being deflected to the right, and fluid trapped on the right-hand side of the diaphragm is being displaced out through the back portion 186 of the plug valve to outlet A. In the same manner, by rotating the position of the ports in the plug valve 90°, the reverse action will take place and inlet number 2 will be flowing and outlet B will be discharging. This is shown in FIG. 10 of the drawings. Because of the front and back porting of the plug valves and the single diaphragm of the pump, the fluid which is supplied to inlet 1 is always handled by the ports connected by the front portion of the valve and the lefthand portion of the diaphragm. In a similar manner, the fluid handled by inlet number 2 is always passed to the ports on the back section of the plug valve and the right-hand side of a minus delta P diaphragm metering pump. Due to this arrangement, the two fluids are never intermixed or go through common passageways so that there is no possible contamination of the fluids.

Figure 5:
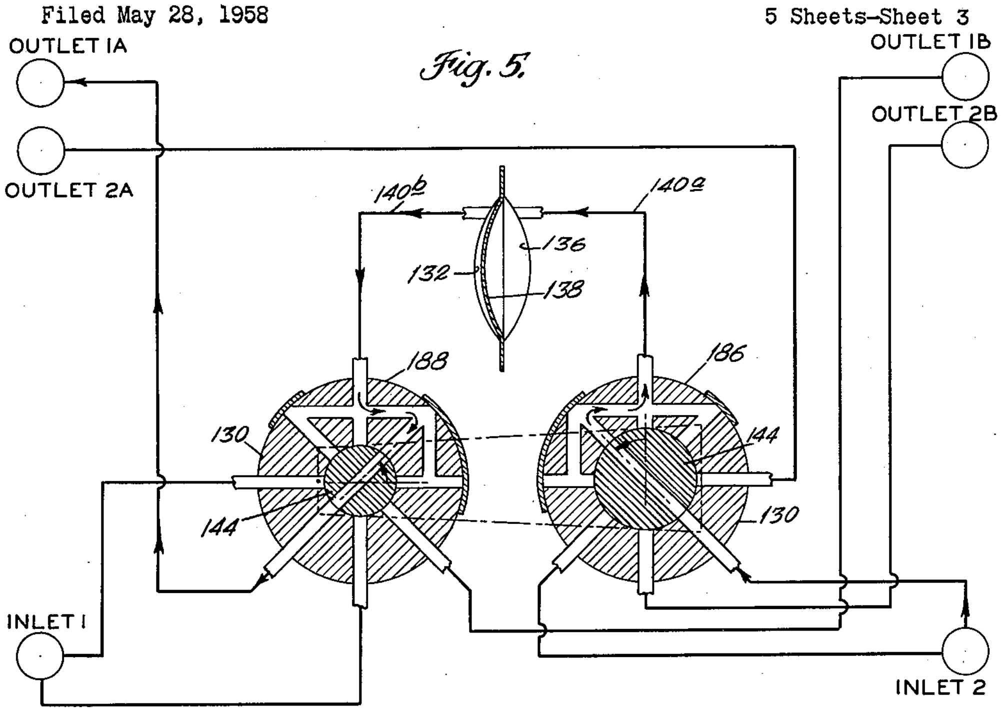
Figure 6:
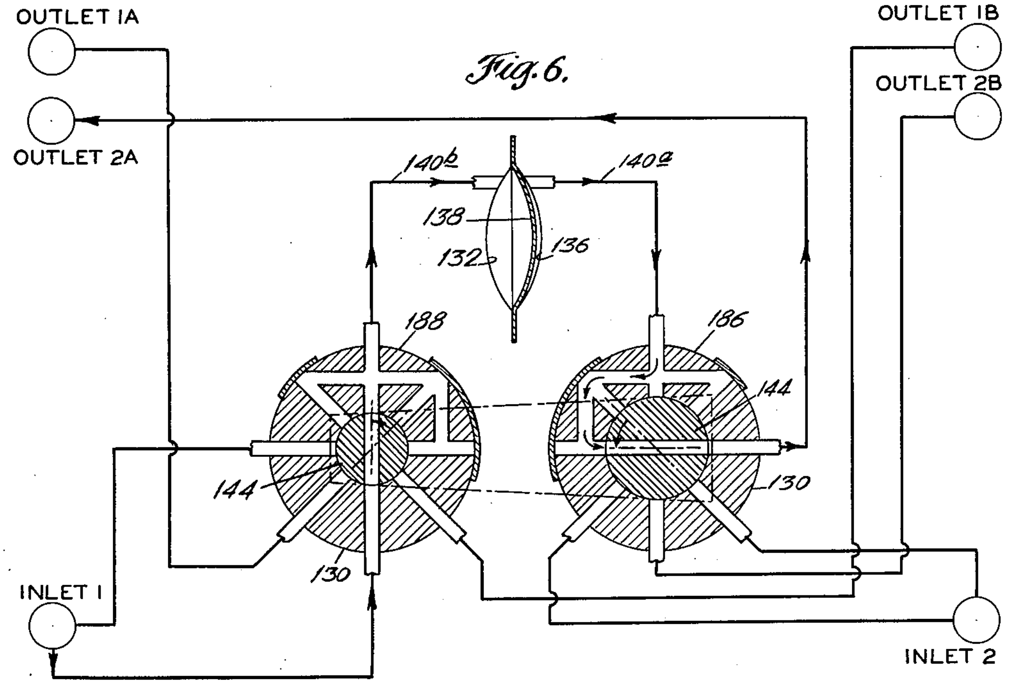

FIGS. 5–8 show the flow diagrams for the porting arrangement with two separate inlets and four separate outlets. The main difference between this form of the invention and the previously described two inlet, two outlet arrangement is that the Teflon plug value is rotated in steps of 45° instead of 90° as explained with reference to FIGS. 2–4. Here again there is no intermixing of either of the fluids and consequently the possibility of handling two different reagents with each metering pump assembly without any contamination or intermixing of the reagents. In FIG. 5 the flow is from inlet 2 to outlet 1A. In FIG. 6 the flow is from inlet 1 to outlet 2A. In FIG. 7 the flow is from inlet 2 to outlet 1B. In FIG. 8 the flow is from inlet 1 to outlet 2B. In FIGS. 5 and 7 the diaphragm pump is actuated to the left and in FIGS. 6 and 8 the diaphragm pump is operated to the right. It is to be noted that in the lower left-hand corner of FIG. 4, the plug valve connections are diagrammatically indicated, and agree with the connections shown in the flow diagrams of FIGS. 5–8 inclusive.

The construction and operation of the various structural features of the present invention will be apparent from the foregoing discussion of embodiments thereof. It is to be understood, however, that minor changes in details of construction can be effected by those skilled in the art without departing from the spirit and scope of the invention as defined in, and limited solely by, the appended claims.

I claim:

1. In a colorimetric analyzer for determining an amount of a constituent in a fluid by simultaneous optical comparison of radiation transmission properties of equal volume samples of the fluid, sample and comparison cells, means for introducing separate volumetric increments of sample fluid into each said cell, means for introducing first and second increments of a plurality of reagents of equal volume and strength into said sample and comparison cells respectively, said first increment of reagents operable to effect by chemical reaction a color change in the fluid in said sample cell by an amount related to the amount of constituent in said sample fluid and reagents, means in fluid communication with said comparison cell for premixing at least two reagents of said second increment to effect by chemical reaction a color change by an amount related solely to the amount of constituent in said reagents prior to mixing thereof with the fluid in said comparison cell and the remainder of reagents in said second increment operable to prevent reactivity of said premixed reagent with the constituent in the sample fluid in said comparison cell and means for measuring and comparing the radiation transmission ratio of the fluid in said sample and comparison cells to indicate precisely the concentration of said constituent in said sample fluid.

2. In a colorimetric analyzer for determining an amount of a constituent in a fluid by simultaneous optical comparison of radiation transmission properties of equal volume samples of the fluid, sample and comparison cells, means for introducing separate volumetric increments of sample fluid into each said cell, means for introducing first and second increments of a plurality of reagents of equal volume and strength into said sample and comparison cells respectively, said first increment of reagents operable to effect by chemical reaction a color change in the fluid by an amount related to the amount of constituent in said sample fluid and reagents, a reagent reaction vessel in fluid communication with said comparison cell, means for premixing at least two of said reagents of said second increment in said reagent reaction vessel to effect by chemical reaction a color change by an amount related solely to the amount of constituent in said reagents prior to mixing thereof with the fluid in said comparison cell and the remainder of reagents in said second increment operable to prevent reactivity of said premixed reagent with the constituent in the sample fluid in said comparison cell, and means for measuring and comparing the radiation transmission ratio of the fluids in said sample and comparison cells to indicate precisely the concentration of said constituent in said sample fluid.

3. In a colorimetric analyzer for determining an amount of a constituent in a fluid by simultaneous optical comparison of radiation transmission properties of equal volume samples of the fluid, sample and comparison cells and a reagent reaction vessel in fluid communication with said comparison cell, means for introducing separate volumetric increments of sample fluid into each said cell, means for introducing a first reagent of predetermined volume and strength reactive with said constituent and a second buffer reagent of predetermined volume and strength into said reagent reaction vessel change is effected by an amount related solely to the amount of constituent in said reagents, means for transmitting the premixed first and second reagents from said reagent reaction vessel to said sample fluid in said comparison cell, means for introducing a third short-stop reagent of predetermined volume and strength into said comparison cell prior to introduction of said premixed first and second reagents therein, said short-stop reagent preventing reactivity of said first reagent with said constituent in the sample fluid in said comparison cell, means for introducing a fourth reducer reagent into said comparison cell after the introduction of said first and second reagents therein operable to develop the color change effected by said premixing of said first and second reagents, means for introducing an amount of each of said first, second, third and fourth reagents into said sample cell equal in volume and strength to the respective amounts thereof introduced into said comparison cell adapted to produce by chemical reaction a color change of the fluid by an amount related to the concentration of said constituent in said reagents and said sample fluid, said first and second reagents being introduced to said sample cell prior to said third reagent and means for measuring and comparing the radiation transmission ratio of the fluids in said sample and comparison cells to indicate precisely the concentration of said constituent in said sample fluid.

4. In a colorimetric analyzer as claimed in claim 1, metering and measuring means for introducing said equal volumetric increments of said sample fluid into said cells, separate fluid conduits extending between said metering and measuring means and said sample and comparison cells respectively, said measuring and metering means including a diaphragm pump with two equal volume pump cavities therein, a valve including a valve body with a bore therein, a rotatable plug in said bore, two inlets and two outlets into said valve body, passageways in said valve body interconnecting separately each said cavity and said bore, passageways in said valve body interconnecting separately each said inlet and outlet with said bore, and two axially spaced passageways in said plug at right angles to one another, said plug being adapted on rotation in 90° steps to selectively interconnect through said passageways one or the other of said inlets and said outlets with one or the other of said cavities and prevent intermix of fluids passing therethrough.

5. In a colorimetric analyzer as claimed in claim 2, reagent metering and measuring means for introducing said equal volumetric increments of a plurality of the same reagents into each said cell, fluid conduits interconnecting said reagent metering and measuring means and said sample cell, fluid conduits interconnecting said reagent metering and measuring means and said reagent reaction vessel, cyclically operable means for sequentially introducing said reagents into said reagent reaction vessel and subsequently the mixture thereof into said comparison cell and cyclically operable means for sequentially introducing the same said reagents separately and directly into said sample cell.

6. In a colorimetric analyzer as claimed in claim 5, said reagent reaction vessel being closed, a diaphragm in said reagent reaction vessel, an outlet opening in said reagent reaction vessel, a valve for coaction with said opening including a valve stem secured to said diaphragm, spring means operatively associated with said diaphragm biassing said valve connected thereto to closed position and cyclically operable air pressure means for flexing said diaphragm to open said valve for introducing said reagent mixture to said comparison cell.

7. In a colorimetric analyzer as claimed in claim 5, said reagent metering and measuring means including two inlets and four outlets, said inlets being connected to two reagent sources, two of said outlets being connected to said sample cell and two to said reagent reaction vessel, two sets of passageways in said metering and measuring means for each said reagent, a rotatable plug valve having two axially spaced passageways at right angles to one another, said plug being adapted on rotation in 45° steps to selectively interconnect through said passageways one of said inlets with one of said outlets for passage of a reagent therethrough to either said sample cell or said reagent reaction vessel without intermixing reagents passing therethrough.

8. In a colorimetric analyzer as claimed in claim 7, said metering and measuring means including a diaphragm pump with two equal volume pump cavities therein, each of said cavities being so connected to said passageways that equal quantities of said separate reagents are metered so said sample cell and said reagent reaction vessel with no intermixing or contamination of the reagents.

References Cited in the file of this patent

UNITED STATES PATENTS

| | | |
|---|---|---|
| 1,919,858 | Pettingill | July 25, 1933 |
| 2,063,140 | Allison | Dec. 8, 1936 |
| 2,362,278 | Jones | Nov. 7, 1944 |
| 2,576,747 | Bryant | Nov. 27, 1951 |
| 2,901,327 | Thayer | Aug. 25, 1959 |
| 2,950,396 | Schneider | Aug. 3, 1960 |

OTHER REFERENCES

Olive: Chem. Eng., June 1957, page 305.

UNITED STATES PATENT OFFICE
CERTIFICATE OF CORRECTION

Patent No. 3,030,192 April 17, 1962

George W. Schneider, Jr.

It is hereby certified that error appears in the above numbered patent requiring correction and that the said Letters Patent should read as corrected below.

Column 9, line 44, for "value" read -- valve --; column 10, line 54, after "vessel" insert -- for premixing wherein by chemical reaction a color --.

Signed and sealed this 14th day of August 1962.

(SEAL)
Attest:

ERNEST W. SWIDER
Attesting Officer

DAVID L. LADD
Commissioner of Patents